Patented July 5, 1949

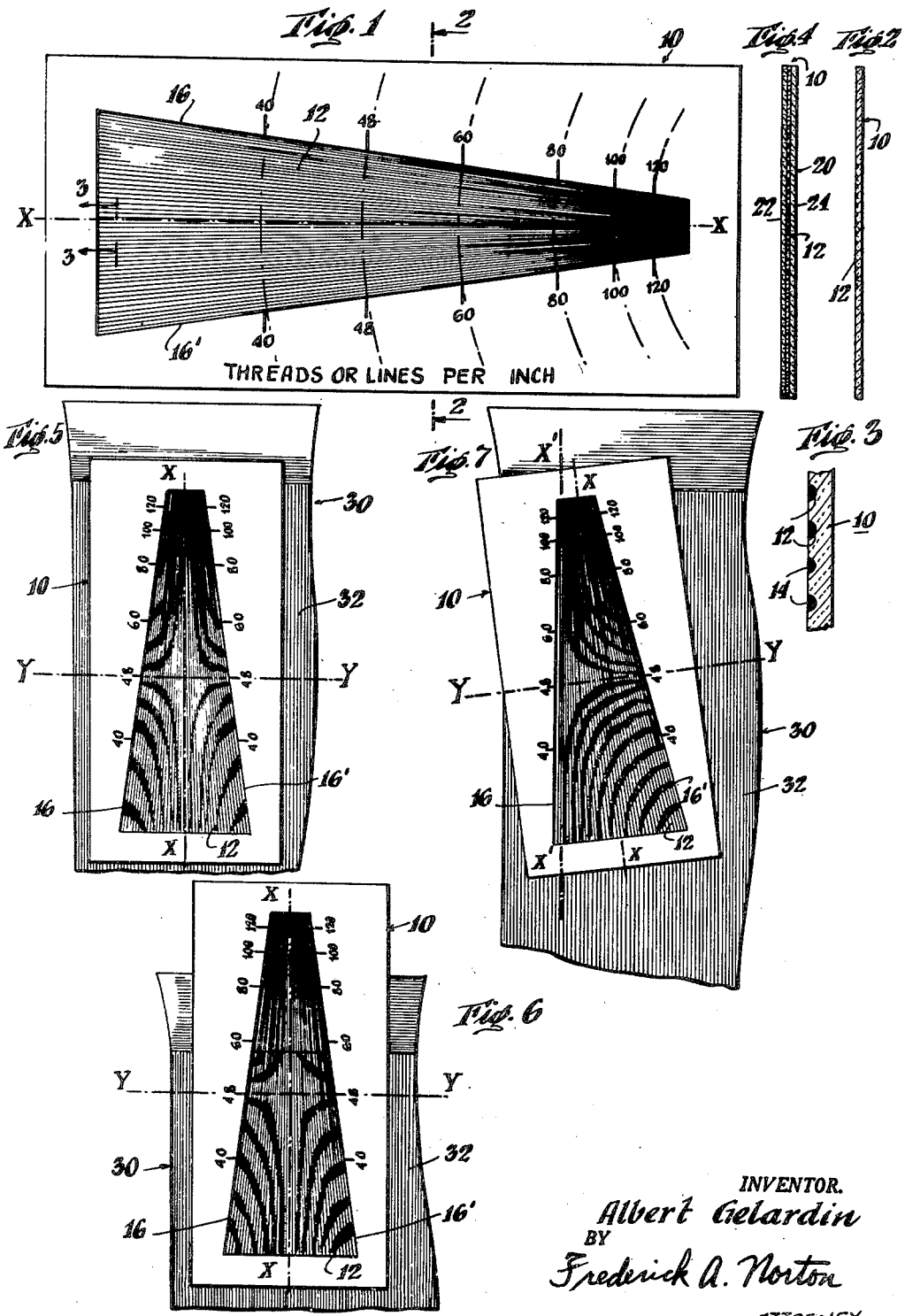

2,475,490

UNITED STATES PATENT OFFICE 2,475,490

DIRECT READING, VISUAL INDEX FORMING INTERSECTION PATTERN THREAD AND LINE COUNTER

Albert Gelardin, New York, N. Y.

Application March 20, 1948, Serial No. 16,022

3 Claims. (Cl. 88—14)

This invention relates to direct reading, visual index forming, intersection pattern thread and line counters and, more particularly, to a device having a calibrated pie-shaped sector, radial line pattern incorporating marginal scales and adapted to form characteristic intersection patterns, comprising families of conjugate hyperbolae, when it is superposed on a fabric with any line of the radial pattern generally parallel to the parallel longitudinal threads of the fabrics, stockings, or other filar material under examination, the transverse asymptote of the hyperbolae pattern cutting the marginal scales, and serving as a sharply defined, direct, visual pointer or index, as well as measuring any system of continuous or broken, parallel, equidistant lines, including engraved screens and the like.

Direct reading instruments for counting the threads per inch in a fabric or screen are not generally available. The classical method involves the use of the so-called linen counter, comprising an apertured base member having a rectilinear aperture of predetermined width, and with or without a scale, over which a magnifying glass is held in spaced relation. With such devices an actual count of the threads or lines per unit of measurement must be made. Direct reading optical instruments based on the principle of intersection patterns formed at the points of intersection of non-parallel and parallel lines having a common longitudinal axis are known but have been found to be unsatisfactory. Some such instuments form conjugate hyperbolas having asymptote patterns characterized by pronounced skewing of the pattern of the transverse asymptote and the formation of a central area of indeterminate shape, which area is to be utilized as the index. These different intersection patterns I have found to be dependent upon the specific arrangement of the non-parallel, convergent lines of the test device.

I have also found that certain geometric relations must obtain between the radial test lines of the measuring instrument and the parallel threads or longitudinal lines of the material being tested. More particularly, the scales formed on the marginal edges or marginal radial lines of the test device, must be points of intersection of arcs having the point of convergence of the radial lines as a common center. With such an arrangement, the radii are equiangularly spaced. This is in contradistinction to prior art devices in which the index or scale lines are formed by parallel lines normal to the longitudinal axis of the test device and of the parallel threads of the fabric under test. Where the radial lines are so arranged as to intercept equal widths on such cross lines, the angles between successive radial lines of the test device will vary and will be functions of the tangents of the angles.

With my novel test device, including a pie-shaped sector of radial lines having marginal scales calibrated on arcs of concentric circles, the intersection patterns formed with parallel, equidistant, longitudinal threads or line patterns will comprise a series of conjugate hyperbolas. With any line of the radial guide lines generally parallel to the parallel threads of the test fabric, a sharply defined, transverse asymptote pattern, forming a visual index, will substantially lie along an arc of a circle whose center is the center of the radial pattern, and will cut the bilateral scales or indices at points equidistant from the center, no matter what the orientation of the threads of the fabric under test and the longitudinal axis of the tester, so long as any visible intersection pattern is formed.

Thus the sharply defined transverse asymptote of the conjugate hyperbola system, formed as the intersection pattern, serves as a direct-reading, bilateral pointer or index, giving a clear, sharp, single point, identical reading on either or both scales, as opposed to the variable area indexes formed by testing devices using different projective geometrical arrangements of the cooperating lines or rulings of the test instrument and of the parallel threads of the fabric under test.

It is, therefore, a feature of novelty and advantage of the present invention to provide a novel, direct-reading, intersection pattern thread and line counter which is characterized by pin point accuracy.

It is also among the features of novelty and advantage of the present invention to provide direct-reading, intersection pattern thread and line counters comprising a pie-shaped sector of concentric equiangular radial lines, desirably with a longitudinal axis coincident with that of the device, together with duplicate marginal scales coinciding with the marginal radial lines, and in which the points of equal value are points of intersection of common arcs of circles having a center coincident with the common origin or center of radiation of the radial guide lines.

Another and important feature of novelty and advantage of the present invention is the provision of a direct reading, intersection pattern thread and line counter adapted to form a visual intersection pattern comprising families of hyperbolae, when applied to test fabrics or parallel line patterns, the resulting image being characterized by a sharply defined transverse asymptote serving as a variable index.

The above and other desirable features of novelty and advantage of the present invention will be more clearly understood by reference to the accompanying drawings and the specification, wherein a preferred embodiment of the invention is illustrated and described.

In the drawings, like numerals refer to similar parts throughout the several views, of which Fig. 1 is a plan view of a thread counter according to the present invention;

Fig. 2 is a cross-section taken on line 2—2 of Fig. 1;

Fig. 3 is an enlarged detailed cross-section taken on line 3—3 of Fig. 1, showing engraved guide lines with opaque filler material;

Fig. 4 is a view similar to Fig. 2, showing a laminated structure, and

Figs. 5, 6 and 7 are plan views of a test counter in use showing variable orientation of the device with respect to the test fabric.

In the form of the invention shown in Figs. 1, 2 and 3, the thread counter preferably comprises a generally rectangular transparent plastic sheet or panel 10, provided, centrally of its longest dimension, with a pattern comprising concentric radial lines, designated generally by the numeral 12 and printed, engraved, etched, or otherwise formed on the sheet 10 to form a pencil of convergent equiangular lines. The convergent lines of the pattern 12 form a pie-shaped sector having a maximum angular spread of from at least 15° of arc up to approximately 45° of arc. However, and as will be more clearly detailed hereinafter, the optimum angular spread of pattern sector 12 is found to be substantially 20°–25° of arc. In the form shown in the drawings, the sector 12 is intended to approximate at least 20° of arc. As a matter of practice it is preferred to form the pie-shaped sector of the convergent ray pattern or grid so that its central radius or longitudinal axis, X—X, coincides with the central longitudinal axis of the sheet or panel forming the instrument. The common center of the radial line pattern may lie outside of the instrument. The radial lines of grid 12, if engraved or etched, are preferably filled with any suitable opaque material 14 to provide a contrasting pattern and simplify the reading of the intersection pattern formed in use. A feature of particular importance of the present device is the formation and use of identical bilateral scales, 16 and 16', as illustrated, the scale points, as shown, representing lines per inch, and being determined and formed as points of intersection of arcs of concentric circles, with the marginal lines of the radial line pattern, the said circles being concentric with the equiangular radial test lines. The arcs of the concentric circles are illustrated in dash-dot showing in Fig. 1.

The bilateral scales may be formed directly on the sheet or panel 10 upon which the pie-shaped sector of radial lines is engraved or otherwise formed, or they may be formed as separate appliqués to be applied to the marginal lines of the radial line pattern. Two or more scales of different systems may be utilized.

A particular feature of novelty of the present invention is the discovery that the convergent radial line pattern should approximate a pie-shaped sector which subtends an arc of 20°–25° for maximum clarity of the hyperbola patterns and, more particularly, for the development of a sharply defined, substantially linear transverse asymptote pattern in the marginal areas of the pattern. Beyond the marginal limits of the 20°–25° sector, described immediately above, and up to about 45° of arc, the transverse asymptote leaves the arc of the circle, and the reading, as noted herein, becomes inaccurate at and beyond the 45° point. The transverse asymptote pattern approximates a flat curve within the limits set out above, but is found to break sharply at a slight distance from the ends of the 25° arc sector, so that the asymptote pattern no longer coincides with the arc of the curve formed by the central portion of the transverse asymptote of the hyperbola pattern. Where the radial pattern is restricted to a sector subtending an arc of 15° or less, the intersection pattern is diffuse and nebulous, and no sharply defined transverse asymptote is developed. Under such conditions, the intersection area of the crossed asymptotes will have to serve as an index, with, of course, an accompanying lack of definition in any reading attempted. With an angular spread of radial lines of 10° or less, the intersection pattern will comprise spaced dashes of indeterminate overall shape.

The number and angular spacing of any group of concentric radial lines forming the measuring device herein will depend upon the number of lines per inch to be measured and the denier or thickness of the individual lines or threads. Desirably, the interline spacing along any arc of measurement should be equal to the corresponding line width or thread diameter.

Referring now to Fig. 4, a laminated device 20 is shown comprising the panel or sheet 10 faced with protective sheets 22, 24, which, as illustrated, are of transparent material, such as plastic or glass. The three sheets or panels forming the laminae of device 20 may be intimately secured by suitable plastic cements or by interfusion to form a homogeneous unit or they may be mechanically secured as by hollow or solid rivets as well as bound along the outer edges by any suitable framing material. Additionally, the top facing sheet 22 through which the radial guide pattern is viewed, may be made transparent in the pattern and scale area and opaque in the peripheral marginal areas. Likewise, the bottom or base sheet 24 may be made of opaque material including impregnated paper and fabric sheets or metal sheets. The facing sheet 22 can include a metal sheet cut out to receive a transparent viewing panel which conforms to the radial guide pattern. The viewing panel or window may coincide with the radial guide pattern, in which case the marginal scales 16, 16' will be formed as part of the protective outer sheet 22.

The improved thread and line counter can be made in various sizes, and preferably small enough to fit in a vest pocket, thus enhancing its utility and facility of use. While the preferred device hereinabove described is made of transparent plastic materials, it is to be understood, as noted generally above, that any or all of the parts may be made of other materials, such as sheet metal suitably engraved or otherwise patterned and provided with contrasting color backgrounds and guide lines. Additionally, where the thread and line counters are to be used in particular industries, as in photolithography, and for special fabrics where colors are determinants, the various parts of the instrument may be suitably colored to avoid any masking effects due to the coloring of the threads of the fabric.

Referring now to Figs. 5 to 7, it will be seen that when the thread counter 10 is applied over a fabric such as a stocking 30 having substantially parallel longitudinal threads, indicated generally at 32, with any one of the radial lines of the counter parallel to the threads, an intersection pattern is established by the points of intersection of the radial lines 12 with the corresponding parallel longitudinal lines or threads 32 of the test fabric. With the device herein the pattern of intersections formed by the corresponding lines of the two pencils appears to be comprised of families of conjugate hyperbolas. These define two asymptotes, the transverse asymptote, designated as Y—Y lying along the arc of a circle, within the field of view of the instrument, concentric with the radial lines of the instrument, and the longitudinal asymptote pattern, designated by the line X—X, which lies parallel to or along the coincidence of any radial line and a longitudinal test line. It will be seen that with the longitudinal axis X—X of the tester generally parallel to the longitudinal threads of the fabric under test, the transverse asymptote Y—Y will cut the bilateral scales at points of equal value and will, in effect, although curvilinear, function as a sharply defined, straight line pointer or index, as shown in Fig. 5, even if shifted along its longitudinal axis, as shown in Fig. 6 (where substantially the major portion of the upper half of the intersection pattern disappears). In this latter case it will be seen that the transverse asymptote pattern defining the Y—Y axis will coincide with the same scale markings as in Fig. 5.

In the extreme case, illustrated in Fig. 7, where a marginal radial line (designated generally as X'—X') is generally parallel to the parallel longitudinal threads 32 of the stocking, and half of the coaxial hyperbolas are visible, one half of the transverse asymptote Y—Y is effective to serve as a sharply defined visual index and pointer and give a clear reading or thread count.

As set forth hereinabove, the intersection patterns of Figs. 4 to 6 comprise families of conjugate hyperbolas. The curvature of the Y—Y asymptote, as shown in the drawings, has been minimized in order to bring out the characteristic feature of the Y—Y asymptote pattern axis which is unique with the device of the present invention and which is, as pointed out above, that it forms the sharply defined visual indicator of the device herein, permitting an instant and accurate reading of the thread count of the fabric under test.

As previously noted, the spacing and angular orientation of the radial lines 12 will be separately determined for the class or type of lines, fabrics, or threads to be tested. Whatever the spacing and orientation of the radial lines, it is preferred that they be precision ruled and completely opaque. My preferred method of ruling the radial lines is to use a geometric engraving machine and to fill the lines formed with an opaque filling which will preclude the passage of any light rays through or from the lines. This is particularly important where transparent sheet materials, such as methacrylate copolymers, polyvinylidene copolymers, styrene polymers and copolymers, and other plastics exhibiting similar characteristics are used. Because of the overall lightness and good wearing qualities of the plastic base materials referred to immediately hereinabove, lightweight vest pocket thread counters can be made which are preferable to metal devices having enameled surfaces which will abrade and chip off under conditions of protracted use.

The simple equiangular radial line design, of predetermined arcuate extent, of the device herein produces a definite and characteristic intersection pattern, the essential characteristic of which, from the point of view of the present invention, is the formation of a substantially curvilinear visual asymptote pattern, transverse to the longitudinal axis of the system, and serving as a direct-reading pointer or index cutting the bilateral scales of the instrument. With proper machine ruling, and complete opacity of the ruled lines, applicant's measuring device gives a very sharp intersection pattern with the families of hyperbolas clearly outlined so that the patterns defining the asymptotic axes are sharply and narrowly delineated. Another and interesting characteristic of the device herein resides in the fact that recurrent patterns are obtained with multiples of any given number or index. Thus, with a fabric having 96 parallel longitudinal threads to the inch, a characteristic dark conjugate hyperbola pattern will be obtained with a sharply defined asymptotic index axis. If the measuring device is moved on the same fabric to bring the 48-thread portion of the scale into the field, it will be observed that substantially the same general pattern is formed but the hyperbolas are lighter in color and more diffuse. Therefore, with the instrument of the present invention, there is no question of which of a number of readings is to be taken. It will always be the one having the darkest and most concentrated pattern and in which the asymptotes, and particularly the transverse asymptote axis is most clearly and narrowly delineated.

What is claimed is:

1. A visual index, intersection pattern measuring device for measuring the spacing of parallel lines, comprising a system of convergent, equiangular, radial lines, forming a pie-shaped sector having an angular extent of 15° to 45° of arc, at least one scale along an edge of the sector, said lines being adapted to produce a visual intersection pattern comprised of families of conjugated hyperbolae, including a sharply defined transverse asymptote, when apposed to a set of equidistant parallel lines, whose spacing is to be measured, with any one of the radial lines substantially parallel to the said parallel lines, the so-formed asymptote cutting the scale at the point corresponding to the line spacing of the lines being measured.

2. Measuring device according to claim 1 in which the subtended arc of the pie-shaped sector is 20°–25°.

3. A measuring device according to claim 1 including bilateral scales.

ALBERT GELARDIN.

REFERENCES CITED

The following references are of record in the file of this patent:

UNITED STATES PATENTS

| Number | Name | Date |
|--------|------|------|
| 1,831,536 | Luhn | Nov. 10, 1931 |
| 2,171,504 | Keuffel et al. | Aug. 29, 1939 |